United States Patent
Illindala et al.

(10) Patent No.: US 12,374,888 B1
(45) Date of Patent: Jul. 29, 2025

(54) VOLTAGE SOURCE INVERTER CONTROL FOR UNBALANCED AND NONLINEAR LOADS

(71) Applicant: Caterpillar Inc., Peoria, IL (US)

(72) Inventors: Mahesh Sitaram Illindala, Delaware, OH (US); Varsha Sunkara, Columbus, OH (US); Seok-Hee Han, Dunlap, IL (US); Jackson Wai, Dunlap, IL (US); Jesse R. Gerdes, Dunlap, IL (US); Dachuan Yu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/415,227

(22) Filed: Jan. 17, 2024

(51) Int. Cl.
| | |
|---|---|
| H02M 1/36 | (2007.01) |
| H02J 3/00 | (2006.01) |
| H02J 3/01 | (2006.01) |
| H02J 3/38 | (2006.01) |
| H02M 1/12 | (2006.01) |
| H02M 7/5387 | (2007.01) |

(52) U.S. Cl.
CPC ............. H02J 3/002 (2020.01); H02J 3/01 (2013.01); H02J 3/381 (2013.01); H02M 1/126 (2013.01); H02M 7/53873 (2013.01)

(58) Field of Classification Search
CPC ........................................................ H02J 1/00
See application file for complete search history.

(56) References Cited

U.S. PATENT DOCUMENTS

| | | | |
|---|---|---|---|
| 11,101,663 B2 * | 8/2021 | Zhang | H02J 3/388 |
| 2016/0156291 A1 * | 6/2016 | Becker | H02P 21/30 |
| | | | 318/400.26 |
| 2016/0218657 A1 * | 7/2016 | Nondahl | H02P 6/21 |
| 2017/0151712 A1 * | 6/2017 | La Forest | B29C 64/118 |
| 2021/0135563 A1 * | 5/2021 | Wei | H02M 7/53876 |
| 2022/0077688 A1 * | 3/2022 | Patarroyo | H02J 3/46 |
| 2024/0297505 A1 * | 9/2024 | Matsumoto | H02J 3/388 |
| 2024/0348154 A1 * | 10/2024 | Qattum | H02M 7/537 |

FOREIGN PATENT DOCUMENTS

| | | |
|---|---|---|
| CN | 102832840 | 12/2012 |
| CN | 104836232 | 2/2017 |
| CN | 106602600 | 4/2017 |
| CN | 109617115 | 4/2019 |

(Continued)

OTHER PUBLICATIONS

Gao Cheng et al. "Current multi-loop control strategy for grid connected inverter with LCL filter", Article, Publication date: May 18, 2018, pp. 712-716.

(Continued)

Primary Examiner — Jared Fureman
Assistant Examiner — Esayas G Yeshaw
(74) Attorney, Agent, or Firm — Schwegman

(57) ABSTRACT

An interface circuit to interface an energy source to a power bus of a microgrid includes a switching inverter circuit, an output filter circuit coupled between an output of the three-phase inverter circuit and the power bus, and a control circuit loop to control switching of the switching inverter circuit. The control circuit loop is coupled to the output filter circuit and the switching inverter and includes a proportional-integral oscillator-based repetitive (PIOR) controller.

20 Claims, 9 Drawing Sheets

(56) References Cited

FOREIGN PATENT DOCUMENTS

| | | |
|---|---|---|
| CN | 109936138 | 6/2019 |
| CN | 110165659 | 8/2019 |
| CN | 111130123 | 5/2020 |
| CN | 115360710 | 11/2022 |
| CN | 113691155 | 4/2023 |

OTHER PUBLICATIONS

Zhong Weidong et al: Odd-Harmonic Repetitive Control Scheme in Two-phase Stationary Frame for Grid-Connected Inverter, Article, Publication date: Nov. 5, 2023, pp. 4456-4459.
Written Opinion and International Search Report for Int'l. Patent Appln. No. PCT/US2024/060689, mailed Mar. 13, 2025 (12 pgs).

* cited by examiner

VOLTAGE SOURCE INVERTER CONTROL FOR UNBALANCED AND NONLINEAR LOADS

TECHNICAL FIELD

This document relates to energy microgrids for work sites and in particular to an interface circuit to connect an energy source to a microgrid.

BACKGROUND

Powering large moving work machines (e.g., wheel loaders, mining trucks, etc.) electrically with zero emissions sources requires a large mobile electric energy source (e.g., an energy storage battery or battery system) or a tethered electrical connection that can provide current (e.g., tens to hundreds of Amperes (Amps) of current). A job site where several large electric work machines operate can often be a remote location where work machines that use energy storage batteries need to be recharged, and tethered or trolleyed work machines may need off-board energy storage systems to stabilize voltage and frequency and minimize electricity charges during periods of peak electricity rates and/or peak electricity demand. Additionally, at remote job sites, the utility grid electrical infrastructure for charging the batteries of the work machines or the off-board energy storage systems is either very limited or non-existent. A microgrid can be constructed at job sites to provide or enhance the infrastructure to provide energy to power the work machines. A microgrid can use energy produced by different types of energy assets, such as generator sets (or gensets), battery energy storage systems (ESSs), photovoltaic sources (e.g., solar panels), wind turbines, fuel cells, hydrogen production and storage, etc., to provide energy to the job site. Controllers are typically used to interface the output of an energy source to a power bus of an energy microgrid. However, there can be challenges in connecting a nonconventional energy source (example a photovoltaic source) to a microgrid. Conventional controllers to connect such energy sources may have compromised functionality during unbalanced grid conditions.

SUMMARY OF THE INVENTION

Electric powered large moving work machines use large capacity battery systems that need charging or a tethered electrical connection. It is desired to provide power to the work machines at a remote job site using a microgrid system that utilizes diverse energy assets to provide energy to the microgrid system.

An example interface circuit to interface an energy source to a power bus of a microgrid includes a switching inverter circuit, an output filter circuit coupled between an output of the three-phase inverter circuit and the power bus, and a control circuit loop to control switching of the switching inverter circuit. The control circuit loop is coupled to the output filter circuit and the switching inverter and includes a proportional-integral oscillator-based repetitive (PIOR) controller.

An example method of connecting an energy source to a microgrid includes receiving DC power from a DC source of the microgrid, converting the DC Power to AC power using a switching inverter circuit, filtering the AC power using an output filter circuit, producing control signals for the switching inverter circuit using a PIOR controller included in a first control circuit loop connected to the output filter circuit, and applying the filtered AC power to a power bus of the microgrid.

DETAILED DESCRIPTION

Examples according to this disclosure are directed to systems and methods that improve the interface between an energy source or energy asset and a microgrid system.

Figure 1:
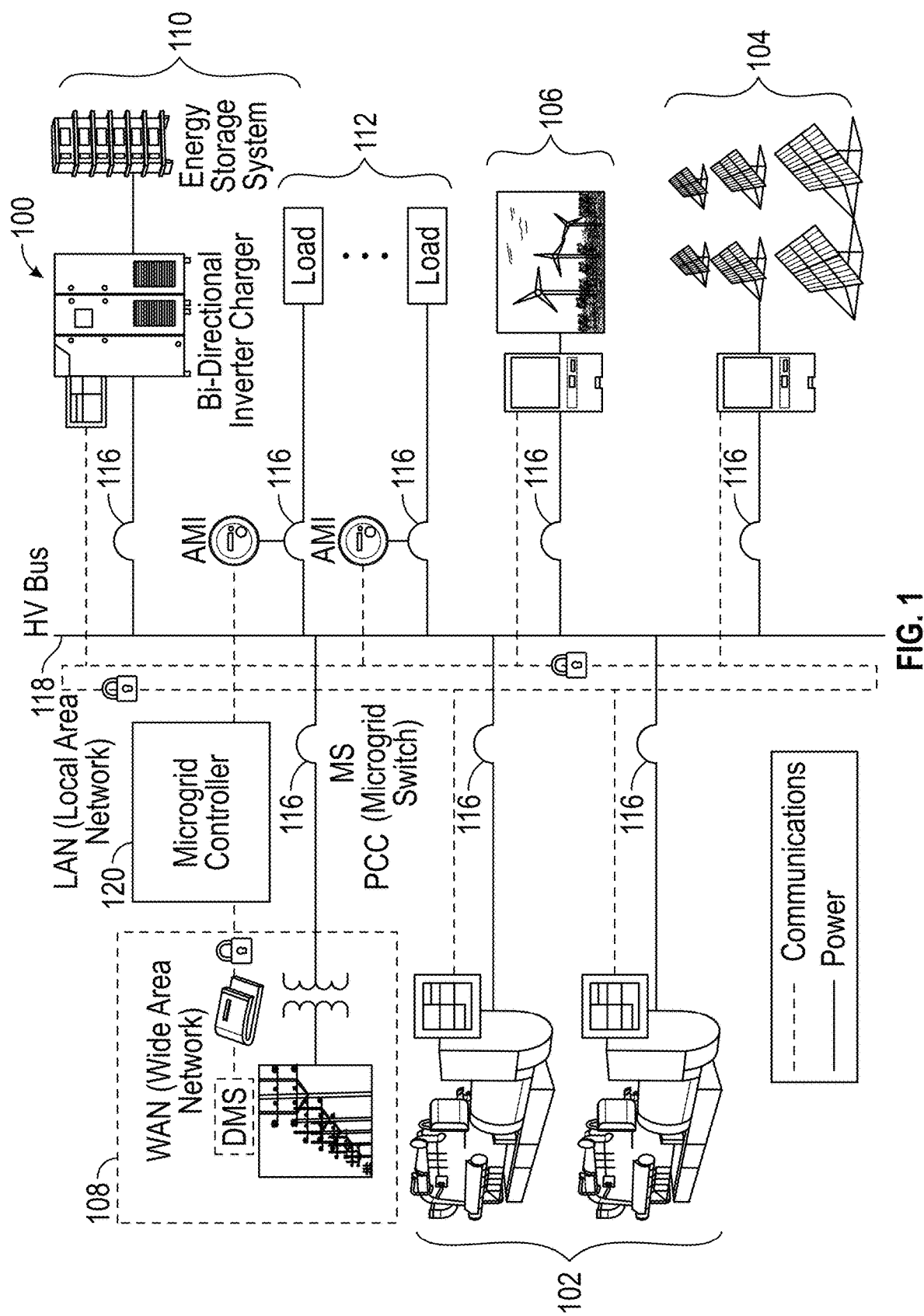
FIG. 1 is an illustration of an example microgrid system in accordance with this disclosure.

FIG. 1 is an illustration of portions of an example of a microgrid system 100. The microgrid system 100 includes multiple energy assets of multiple energy asset types connected to a high voltage bus 118 (HV Bus) or power bus through microgrid switches 116. The example of FIG. 1 shows groups of energy assets that include fueled assets such as generator sets (or gensets) 102, and renewable energy assets such as photovoltaics 104 and wind turbines 106. The gensets 102 can be diesel fueled, gas reciprocating, gas turbines, hydrogen reciprocating, hydrogen turbines, blended fuel gensets, etc. The microgrid system 100 may include a connection to a utility grid 108.

The microgrid system 100 also includes one or more energy storage systems 110 (ESSs). An ESS 110 can include battery systems, hydrogen storage systems with electrolyzer, pumped hydro-electric systems, etc. An ESS 110 of the microgrid can be used to store excess energy created by energy assets or to store energy from the utility grid 108 during times when grid energy is lower cost. There can be multiple loads 112 on the microgrid system 100. For example, if the microgrid system 100 is powering a mining site, the loads 112 can include chargers for battery powered work machines or the loads 112 can include tethered/trolleyed work machines. The microgrid system 100 includes a microgrid controller 120 that performs supervisory functions of the microgrid system 100 such as dispatching the energy assets based on the power demand on the microgrid system 100. As explained previously herein, it can be challenging to connect an energy asset to the microgrid system 100.

Figure 2:
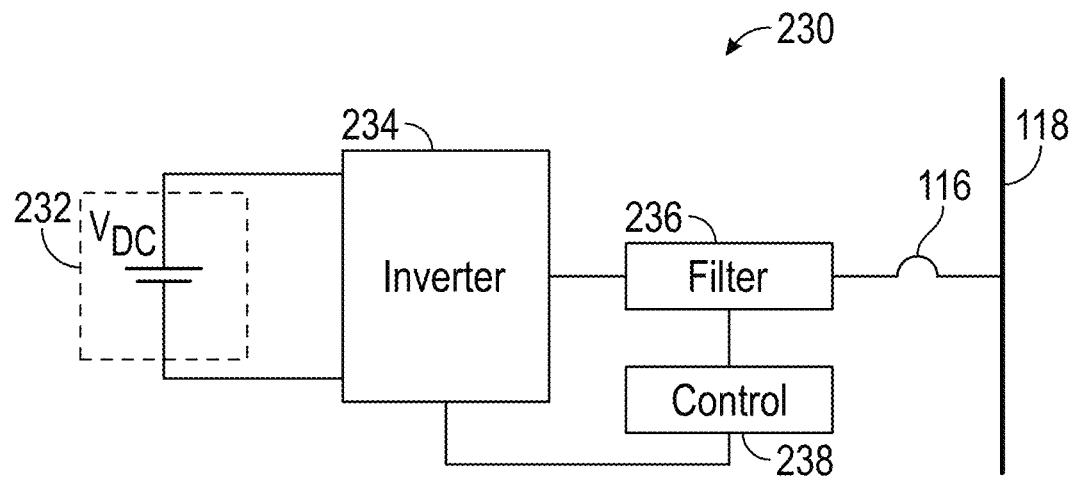
FIG. 2 is a circuit diagram of an interface circuit to interface an energy source to the microgrid in accordance with this disclosure.

FIG. 2 is a block diagram of an example of an interface circuit 230 to connect an energy source to a power bus of a microgrid (e.g., the microgrid system 100 in FIG. 1). The energy source 232 is shown as a Direct Current (DC) voltage source VDC). The energy source 232 may be a renewable energy source such as a photovoltaic source, wind turbine, or fuel cell. In another example, the energy source 232 may be an ESS that provides backup energy to the microgrid. The energy source 232 may also be a non-renewable energy source such as a genset. A switching inverter circuit 234 converts the DC input from the DC source to Alternating Current (AC) output. The AC power is filtered using a filter circuit 235 and the output of the filter circuit 235 is provided to the power bus 118. The interface circuit 230 also includes a control circuit 238 to provide control signals for the switching inverter 234.

Figure 3:
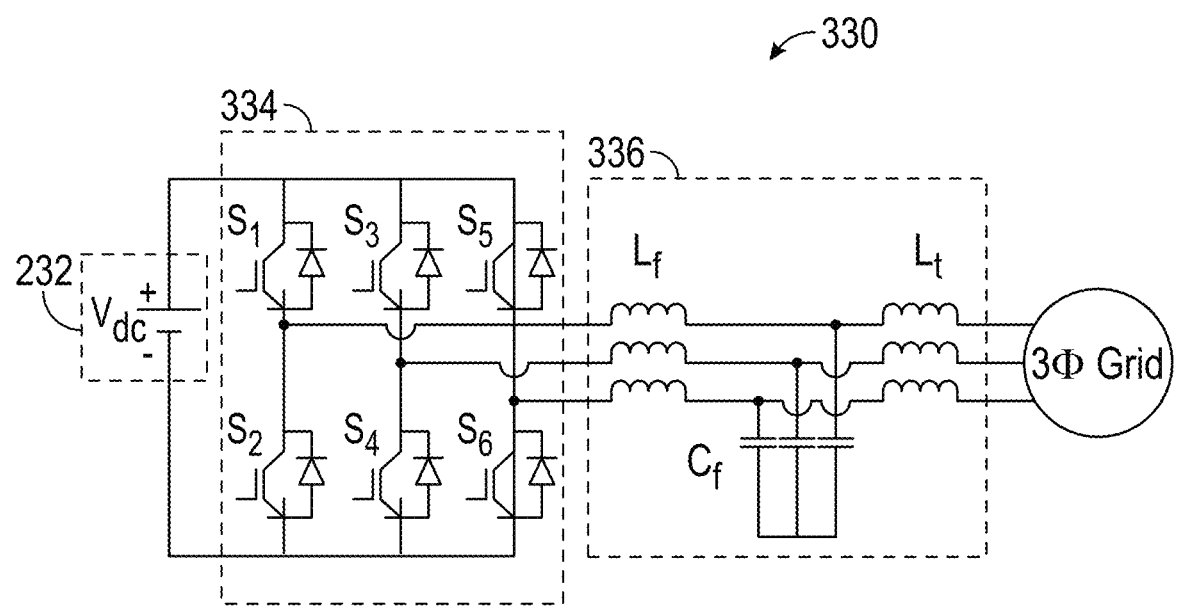
FIG. 3 is a circuit diagram of portions of an example an interface circuit to connect an energy source to a microgrid in accordance with this disclosure.

FIG. 3 is a circuit diagram of portions of an example an interface circuit 330 to connect an energy source 232 to a three-phase power grid (3Φ Grid). The interface circuit 330 includes a switching three-phase inverter circuit 334 with insulated gate bipolar transistors (IGBTs) as the switches. The interface circuit 330 also includes an inductor-capacitor-inductor (LCL) filter circuit 336. The switching three-phase inverter circuit 334 can provide power (e.g., 50 kilowatts or greater) to the grid with a regulated voltage or regulated current.

Figure 4:
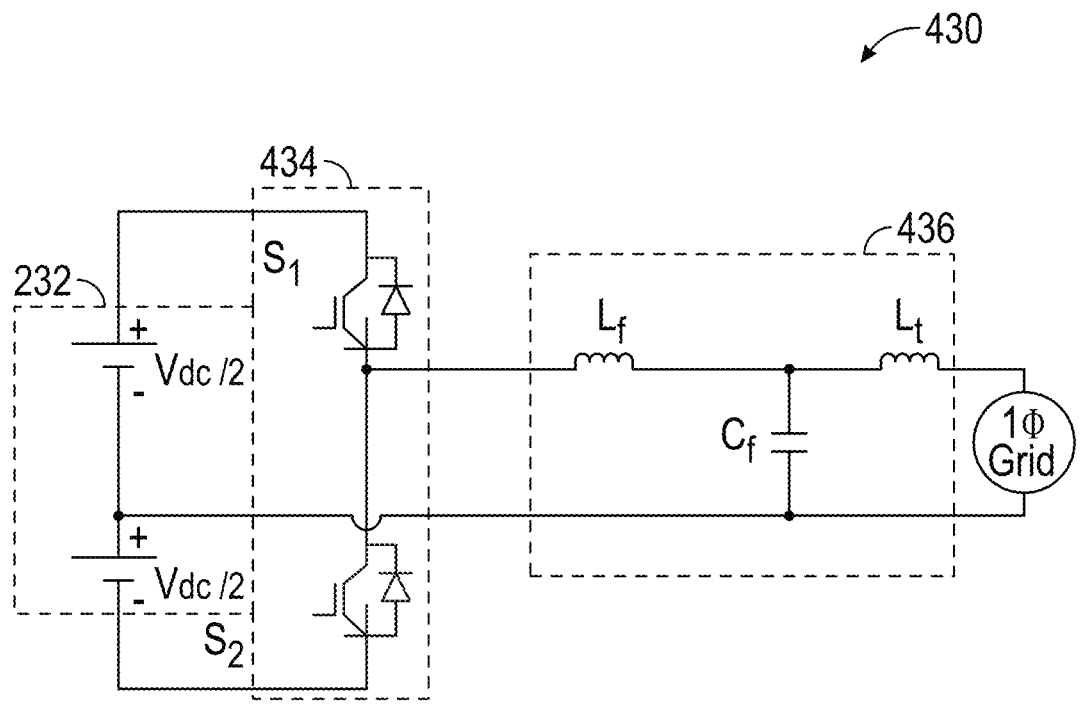
FIG. 4 is a circuit diagram of portions of another example of an interface circuit to interface an energy source to a microgrid in accordance with this disclosure.

FIG. 4 is a circuit diagram of portions of another example of an interface circuit 430 to connect the energy source 232 to a one-phase power grid (1Φ Grid) of lower power than (e.g., 15 kilowatts or less) than the example of FIG. 3. The interface circuit 430 includes a switching half-bridge inverter circuit 434 and a filter circuit that is an LCL circuit 436.

Figure 5:
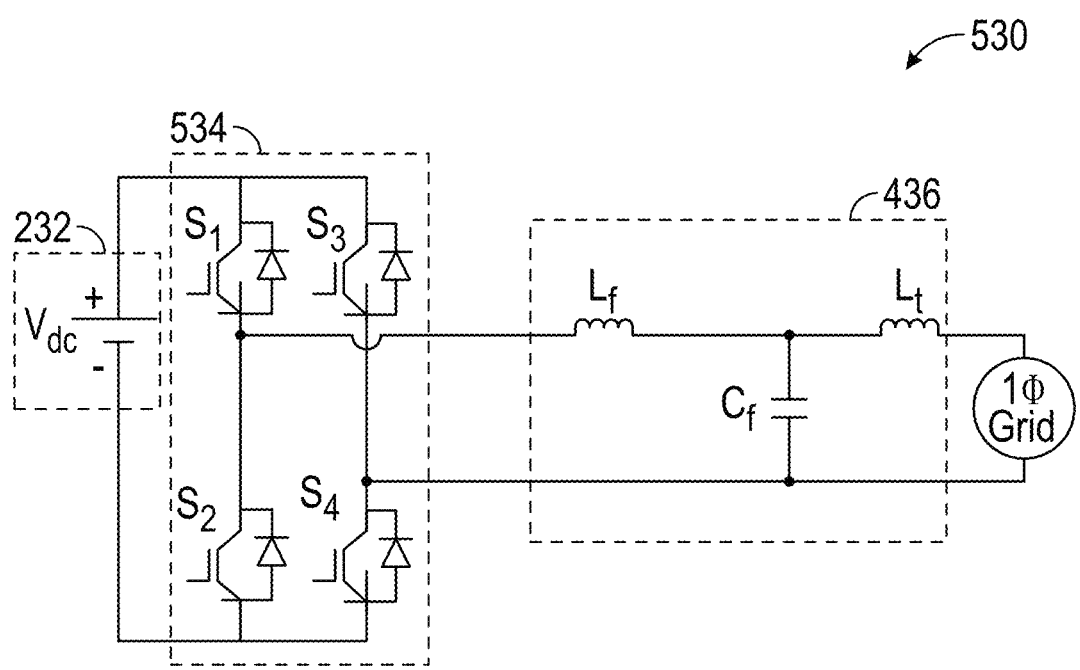
FIG. 5 is a circuit diagram of another example of an interface circuit to interface an energy source to a microgrid in accordance with this disclosure.
Figure 6:
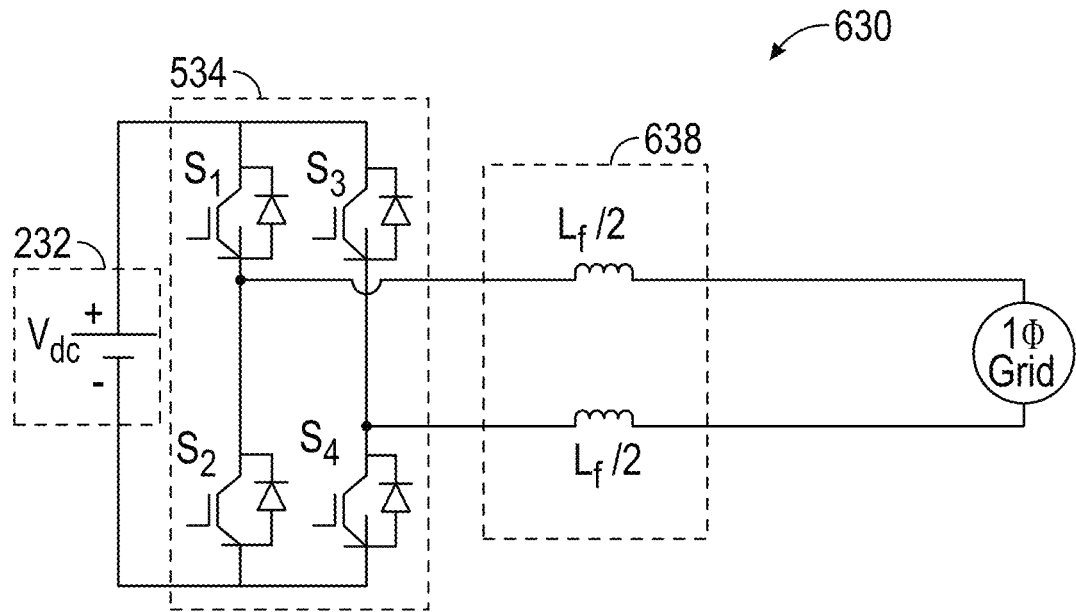
FIGS. 6 and 7 are circuit diagrams of additional examples of interface circuits to interface an energy source to a microgrid in accordance with this disclosure.
Figure 7:
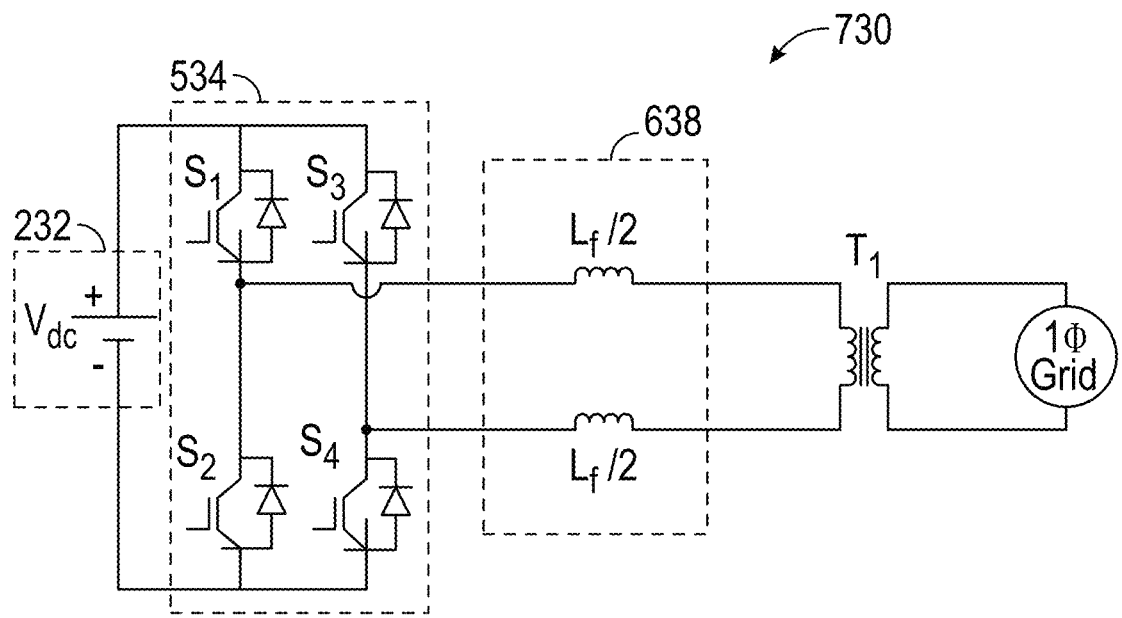

FIG. 5 is a circuit diagram of portions of another example of an interface circuit 530 to connect the energy source 232 to a one-phase power grid. The interface circuit 530 includes a switching full-bridge inverter 534 and the LCL filter circuit 436. FIGS. 6 and 7 are circuit diagrams of additional examples of interface circuits to connect the energy source 232 to a one-phase power grid. The interface circuit 630 of FIG. 6 includes the switching full-bridge inverter 534 and inductors 638 connect the output of the switching full-bridge inverter 534 to the one-phase power grid. The interface circuit 730 of FIG. 7 includes the switching full-bridge inverter 534 and inductors 638 at the output of the switching full-bridge inverter 534. A transformer $T_1$ connects the inductors 638 to the one-phase power grid.

Returning to FIG. 2, the control circuit 238 can provide control signals for the switching of either three-phase inverter circuit 334 of FIG. 3 or the one-phase inverter circuits of FIGS. 4-7. Traditionally, a Proportional-Integral (PI) controller is used in the control of switching inverter circuit, but a PI controller may not be adequate during episodes of weak grid conditions or unbalanced grid conditions.

Figure 8:
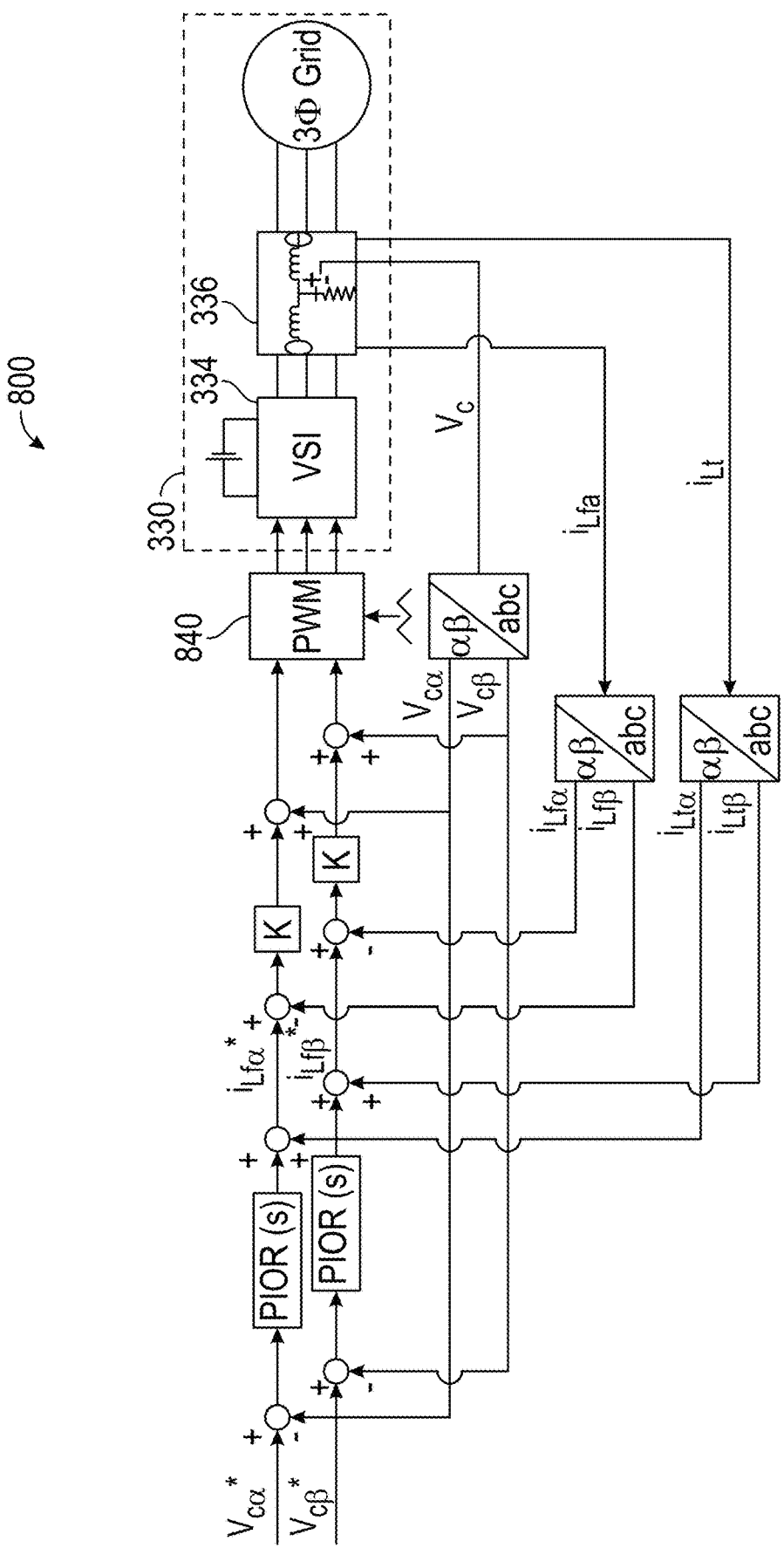
FIG. 8 is a control diagram of a control scheme for a control portion of an interface circuit to interface an energy source to a microgrid in accordance with this disclosure.

FIG. 8 is a control diagram 800 of a control scheme for the control portion of the interface circuit 330 of FIG. 3. The control diagram 800 includes multiple control circuit loops connected to the LCL filter circuit 336. The control circuit loops convert three-phase voltage and current to two-phase voltage and current. The two-phase voltage is input to a proportional-integral oscillator-based repetitive (PIOR) controller with transfer function (PIOR(s)), and the two-phase current is input to a proportional (P) controller with transfer function (K). The PIOR controller and the P controller provide pulse width modulation (PWM) 840 control signals to control the switching of the switching three-phase inverter circuit 334.

Figure 9:
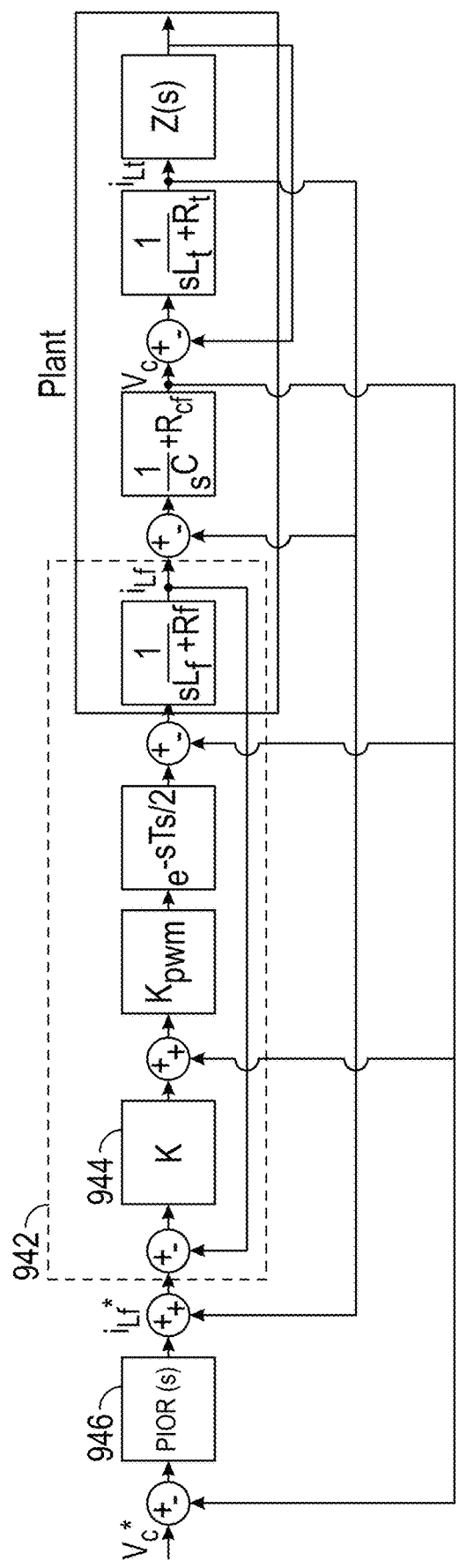
FIG. 9 is a block diagram of an example of a Proportional-Integral Oscillator-based Repetition (PIOR) control scheme for the control portion of an interface circuit to interface an energy source to a microgrid in accordance with this disclosure.

FIG. 9 is a block diagram of an example of a PIOR control scheme 900 for the control portion of the interface circuit 230 of FIG. 2. The control scheme controls the switching of the switching inverter circuit 234 such as by producing PWM control signals to control the switching of the switching inverter circuit 234 in FIG. 2. The control scheme includes an inner control circuit loop 942 that includes a P controller 944 (K block) and an outer control circuit loop that includes a PIOR controller 946. Block $K_{PWM}$ represents the modulation index.

Figure 10:
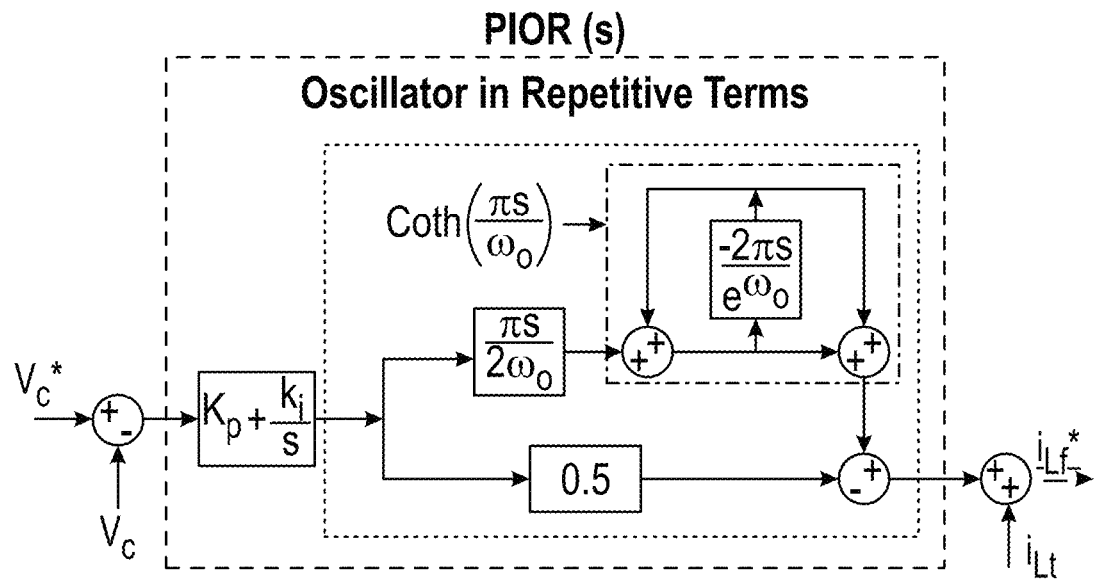
FIG. 10 is a block diagram illustrating the operation of the PIOR controller in the continuous time domain or(s) domain in accordance with this disclosure.

FIG. 10 is a block diagram illustrating the operation of the PIOR controller 1046 in the continuous time domain or(s) domain. The PIOR controller 1046 is a stationary reference frame controller. A stationary two-phase frame is derived from the three-phase ac signals (e.g., using Clarke's transform). The PIOR controller 1046 integrates PI controller elements with an oscillator encompassing repetitive elements. The result is a PIOR controller 1046 that resembles an infinite series of parallel connected (oscillator+PI) units. The continuous time transfer function computed or calculated by the PIOR controller "PIOR(s)" is $$PIOR(s) = G(s) * \left(k_p + \frac{k_i}{s}\right),$$

where $$G(s) = \left[\sum_{k=1}^{\infty}\left(\frac{s^2}{s^2 + (k\omega 0)^2}\right)\right].$$

The infinite series in the previous equation for G(s) can also be expressed as a function of a hyberbolic cotangent (Coth) as $$G(s) = \frac{\pi s}{2\omega_0}\text{Coth}\left(\frac{\pi s}{\omega_0}\right) - \frac{1}{2}.$$

The hyberbolic cotangent (Coth) term of the inner box in FIG. 10 is $$\text{Coth}\left(\frac{\pi s}{\omega_0}\right) = \frac{1 + e^{\frac{2\pi s}{\omega_0}}}{1 - e^{\frac{2\pi s}{\omega_0}}}.$$

Figure 11:
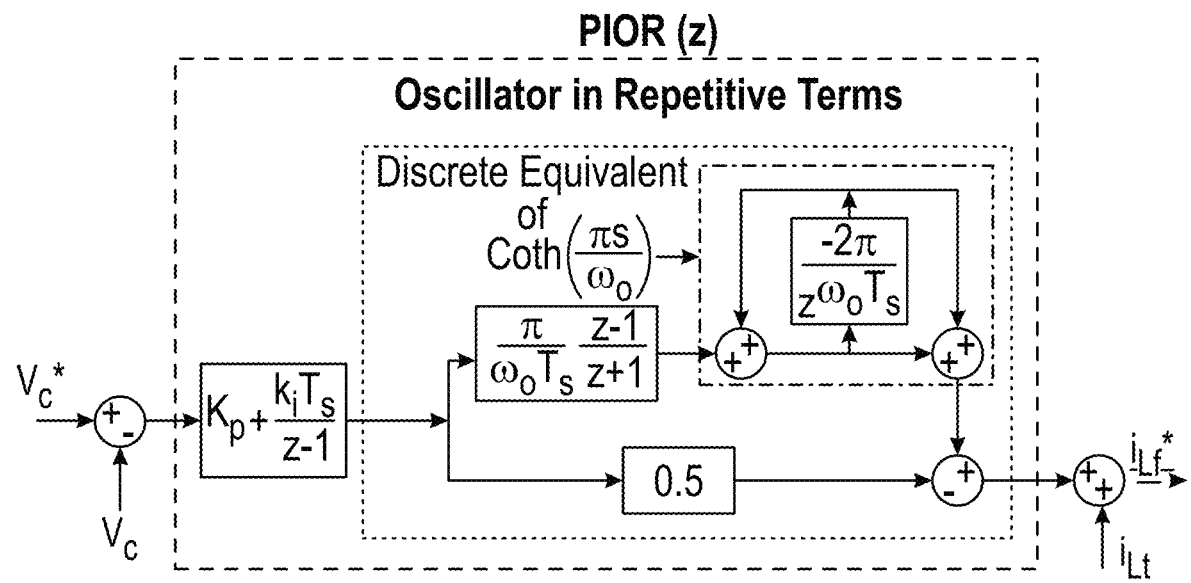
FIG. 11 is a block diagram illustrating the operation of the PIOR controller in the discrete time domain or (z) domain in accordance with this disclosure.

FIG. 11 is a block diagram illustrating the operation of the PIOR controller 646 in the discrete time domain or (z) domain. For $$s = \frac{2}{T_s} \frac{z-1}{z+1},$$

the Coth term in the continuous time domain $$\frac{1+e^{\frac{2\pi s}{\omega_0}}}{1-e^{\frac{2\pi s}{\omega_0}}}$$

translates to $$\frac{1+z^{\frac{-2\pi}{\omega_0 T_s}}}{1-z^{\frac{-2\pi}{\omega_0 T_s}}}$$

in the discrete time domain. The continuous time transfer function computed or calculated by the PIOR controller "PIOR(z)" is $$PIOR(z) = \left(k_p + \frac{k_i T_s}{z-1}\right) \cdot \left[\left(\frac{\pi}{\omega_0 T_s} \frac{z-1}{z+1}\right) \cdot \left(\frac{1+z^{\frac{-2\pi}{\omega_0 T_s}}}{1-z^{\frac{-2\pi}{\omega_0 T_s}}}\right) - 0.5\right]$$

Returning to FIG. 9, the inner control circuit loop is connected to an inductor of the filter circuit 236 of FIG. 2 and the input to the P controller 944 of the inner circuit loop 942 is an inductor current $i_{Lf}$ (e.g., current of an inverter-side inductor in the LCL filter). The outer control circuit loop is connected to a capacitor of the filter circuit and the input to the PIOR controller 946 is a capacitor voltage $V_C$. The control scheme can cause the interface circuit 230 to regulate one or both of the voltage applied to the power bus 118 and the current applied to the power bus 118. In certain examples of the control scheme, a PI controller is used in place of the P controller 944. In examples of more simple lower power versions of the interface circuit 230, the control scheme includes only a PIOR controller 946 and the input to the PIOR controller is an inductor current and the control scheme produces a regulated current at the output of the interface circuit 230.

Figure 12:
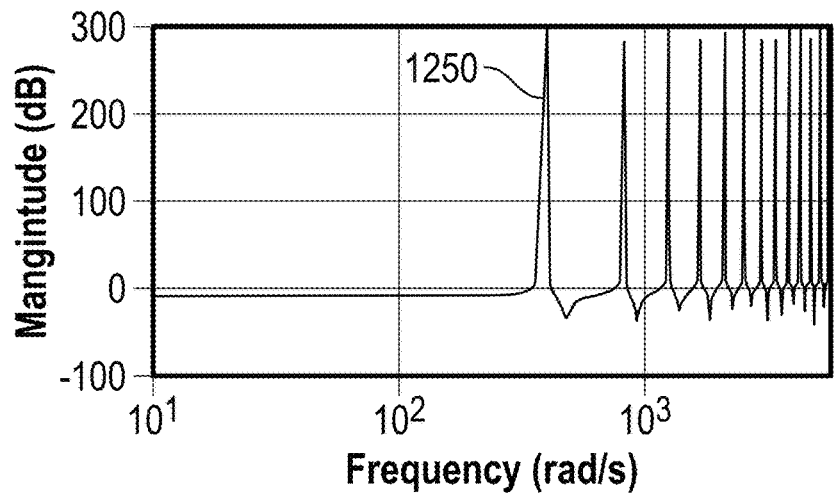
FIG. 12 is a graph of the frequency response of PIOR controller in accordance with this disclosure.
Figure 13:
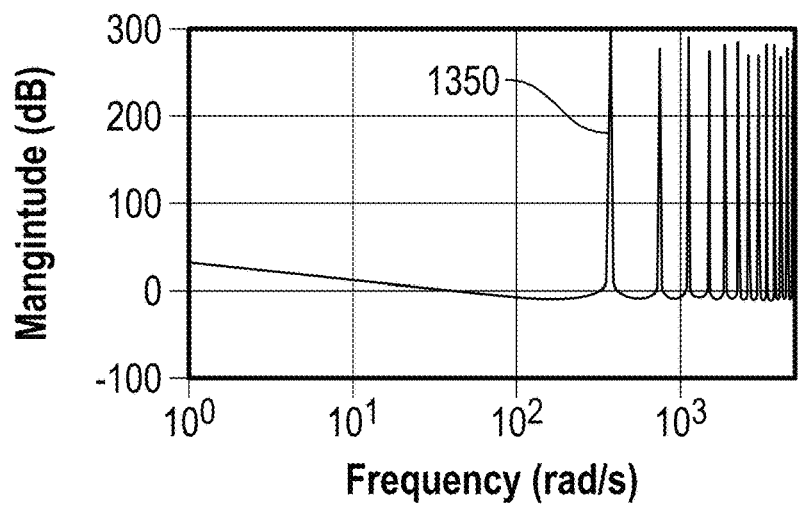
FIG. 13 is a graph of the frequency response of a repetitive controller in accordance with this disclosure.
Figure 14:
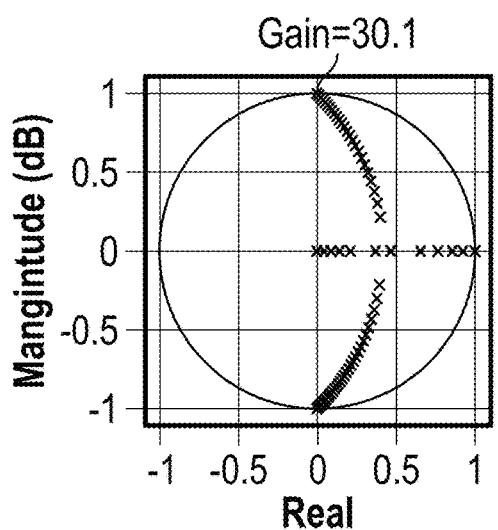
FIG. 14 is a graph of migration of z-domain poles for the PIOR controller in accordance with this disclosure.

FIG. 12 is a graph of the frequency response of PIOR controller 946. The frequency response includes a pole 1250 at the fundamental frequency of the microgrid (e.g., 60 Hz) and has very high gain at the fundamental frequency. The frequency response also includes poles at higher harmonics of the fundamental frequency. At frequencies lower than the fundamental frequency, the frequency response is flat to DC with little or no gain. FIG. 13 is a graph of the frequency response for a repetitive controller (RC). The graph shows that the RC controller has gain at frequencies lower than the fundamental frequency. It should be noted that the RC controller has a slower dynamic response, usually resulting in a delay equivalent to one fundamental period, and their performance can be impacted by fluctuations in the grid frequency. Thus, compared to the RC, the PIOR controller 946 improves tracking of both negative and positive sequence components signals at the fundamental frequency and its harmonics and reduced distortion from non-harmonic frequencies. FIG. 14 is a graph of migration of z-domain poles for the PIOR controller. The graph shows that the PIOR controller provides a stable response for gains up to 30.

The control scheme with the PIOR controller interfaces a non-conventional energy asset such as a renewable energy asset to the microgrid. The interface circuit with PIOR control and the renewable energy asset can be a microgrid forming energy asset of the microgrid system.

INDUSTRIAL APPLICABILITY

Figure 15:
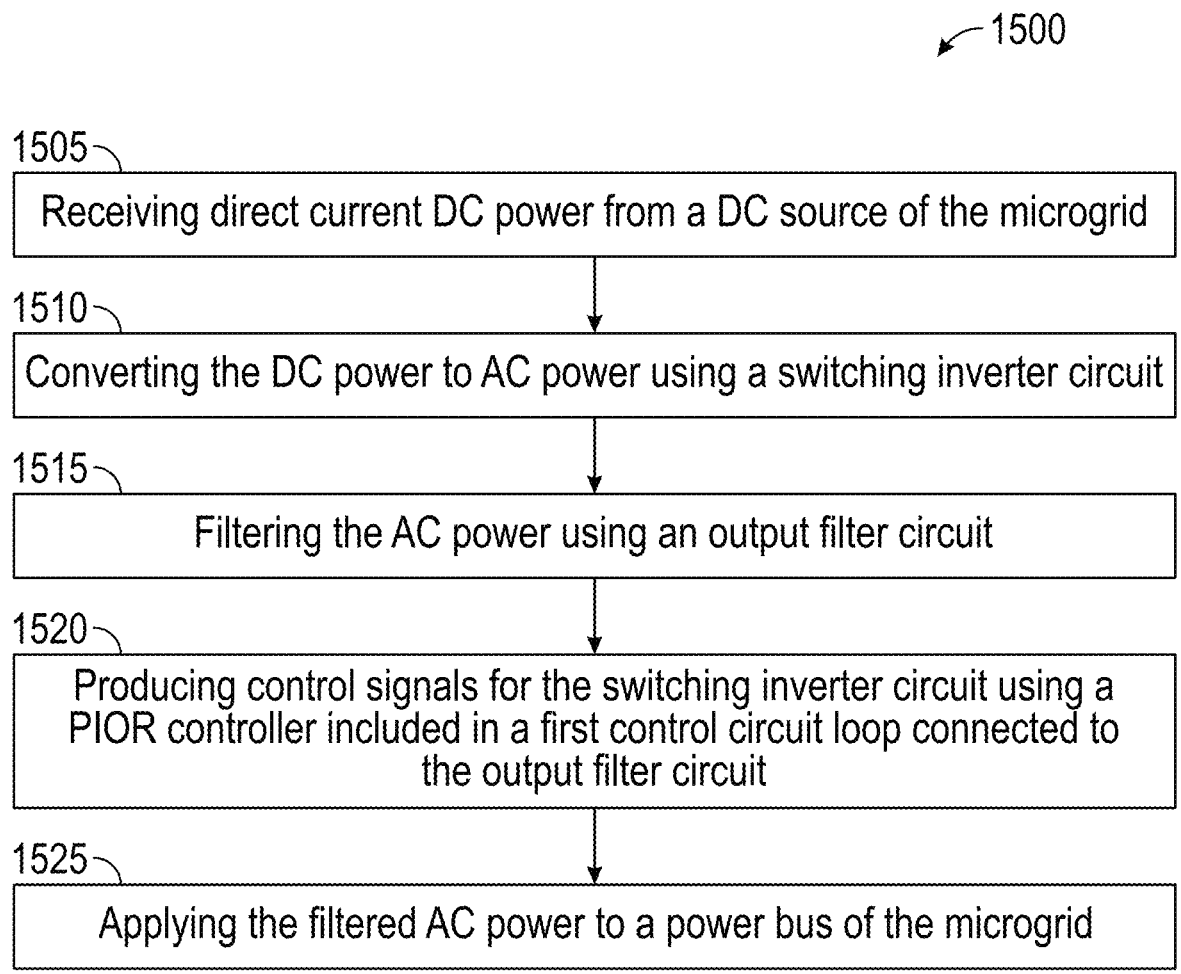
FIG. 15 is a flow diagram of an example of a method of interfacing an energy source to a microgrid in accordance with this disclosure.

FIG. 15 is a flow diagram of an example of a method 1500 of interfacing an energy source to a microgrid. The method 1500 may be performed using the interface circuit 230 of FIG. 2. At block 1505, DC power is received from the energy source. The energy source may be a renewable energy asset of the microgrid system such as photovoltaic sources (e.g., solar panels), wind turbines, fuel cells, etc. In some examples, the energy source is a battery energy storage system (ESS) of the microgrid system.

At block 1510, the DC power is converted to AC power. The DC-to-AC power conversion can be performed using any of the switching inverter circuits described herein. At block 1515, an output filter is used to filter the AC power. The circuit interfacing the power from the energy source to the microgrid includes a control circuit loop that regulates the AC power provided to the microgrid. To regulate the AC power, the control circuit loop feeds back one or more output signals to a PIOR controller (e.g., the PIOR controller 946 in FIG. 9).

At block 1520, the PIOR controller produces control signals to regulate the AC power. In some examples, the PIOR controller and the control circuit loop produce PWM control signals to regulate the output of the switching inverter circuit used to convert the DC power to AC power. At 1525, filtered and regulated AC power is applied to the microgrid.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

What is claimed is:

1. An interface circuit to interface an energy source to a power bus of a microgrid, the interface circuit comprising:
a switching inverter circuit;
an output filter circuit coupled between an output of the switching inverter circuit and the power bus; and
a first control circuit loop to control switching of the switching inverter circuit, wherein the first control circuit loop is coupled to the output filter circuit and the switching inverter and includes a proportional-integral oscillator-based repetitive (PIOR) controller, wherein the PIOR controller includes proportional-integral controller elements and oscillator-repetitive controller elements.

2. The interface circuit of claim 1, including:
a second control circuit loop that is an inner control circuit loop and wherein the first control circuit loop is an outer control circuit loop;
wherein the inner control circuit loop is coupled to the output filter circuit and includes a proportional (P) controller; and
wherein the output filter includes an inductor and a capacitor, and inner control loop is coupled to the inductor and the output control loop is coupled to the capacitor.

3. The interface circuit of claim 1, including:
a second control circuit loop that is an inner control circuit loop and wherein the first control circuit loop is an outer control circuit loop; and
wherein the inner control circuit loop is coupled to the output filter circuit and includes a proportional-integral (PI) controller; and
wherein the output filter includes an inductor and a capacitor, and inner control loop is coupled to the inductor and the output control loop is coupled to the capacitor.

4. The interface circuit of claim 1, wherein the filter circuit includes at least one inductor, and the PIOR controller is configured to control the switching of the switching inverter circuit to regulate current of the inductor.

5. The interface circuit of claim 1,
wherein the switching inverter circuit is a three-phase switching inverter circuit; and
wherein the filter circuit is an LCL filter circuit.

6. The interface circuit of claim 1, wherein a frequency response of the PIOR controller has a pole at a fundamental frequency of the microgrid and at harmonics of the fundamental frequencies, and a flat response at frequencies less than the fundamental frequency.

7. The interface circuit of claim 2, wherein the PIOR controller is a stationary reference frame controller.

8. The interface circuit of claim 1, wherein the PIOR controller is configured to compute a discrete time domain transfer function PIOR (z) to control switching of the switching inverter circuit, wherein $$PIOR(z) = \left(k_p + \frac{k_i T_s}{z-1}\right) \cdot \left[\left(\frac{\pi}{\omega_0 T_s} \frac{z-1}{z+1}\right) \left(\frac{1+z^{\frac{-2\pi}{\omega_0 T_s}}}{1-z^{\frac{-2\pi}{\omega_0 T_s}}}\right) - 0.5\right].$$

9. The interface circuit of claim 1,
wherein the inverter circuit is a three-phase inverter circuit that includes insulated gate bipolar transistors (IGBTs) and switching of the IGBTs is controlled using pulse width modulation (PWM) to convert a direct current (DC) input of the three-phase inverter circuit to an alternating current (AC) output of the three-phase inverter circuit; and
wherein the first control circuit loop provides PWM control to the three-phase inverter circuit.

10. The interface circuit of claim 9, wherein an input of the three-phase inverter circuit is connected to a renewable energy source.

11. The interface circuit of claim 9, wherein an input of the three-phase inverter circuit is connected to an energy storage system.

12. A method of interfacing an energy source to a microgrid, the method comprising:
receiving direct current (DC) power from the energy source of the microgrid;
converting the DC Power to alternating current (AC) power using a switching inverter circuit;
filtering the AC power using an output filter circuit;
producing control signals for the switching inverter circuit using a proportional-integral oscillator-based repetitive (PIOR) controller included in a first control circuit loop connected to the output filter circuit, wherein the PIOR controller includes proportional-integral controller elements and oscillator-repetitive controller elements; and
applying the filtered AC power to a power bus of the microgrid.

13. The method of claim 12, including:
producing the control signals for the switching inverter circuit using the PIOR controller included in the first control circuit loop and a proportional (P) controller included in a second control circuit loop connected to the output filter circuit; and
wherein the PIOR controller regulates a capacitor voltage of a capacitor of the output filter circuit and the P controller regulates an inductor current of an inductor of the output filter circuit.

14. The method of claim 12, including:
producing the control signals for the inverter circuit using the PIOR controller included in the first control circuit loop and a proportional-integral (PI) controller included in a second control circuit loop connected to the output filter circuit; and
wherein the PIOR controller regulates a capacitor voltage of a capacitor of the output filter circuit and the PI controller regulates an inductor current of an inductor of the output filter circuit.

15. The method of claim 12,
wherein the producing the control signals for the switching inverter circuit includes producing pulse width modulation (PWM) signals for the switching inverter circuit by the PIOR controller to regulate inductor current of an inductor of the output filter circuit.

16. The method of claim 12,
wherein the converting the DC Power to AC power includes converting DC power to three-phase AC power using a three-phase switching inverter circuit; and
wherein the producing the control signals for the switching inverter circuit includes producing pulse width modulation (PWM) signals for the three-phase switching inverter circuit using the PIOR controller.

17. The method of claim 12, including:
wherein the producing the control signals for the switching inverter circuit includes calculating by the PIOR controller, a discrete time domain transfer function PIOR (z) to produce the control signals, wherein $$PIOR(z) = \left(k_p + \frac{k_i T_s}{z-1}\right) \cdot \left[\left(\frac{\pi}{\omega_0 T_s}\frac{z-1}{z+1}\right) \cdot \left(\frac{1+z^{\frac{-2\pi}{\omega_0 T_s}}}{1-z^{\frac{-2\pi}{\omega_0 T_s}}}\right) - 0.5\right].$$

18. A microgrid system for a work site, the system comprising:
- multiple energy assets including at least one renewable energy asset;
- an interface circuit to interface the at least one renewable energy asset to a power bus of the microgrid system, the interface circuit comprising:
- a three-phase switching inverter circuit;
- an inductor-capacitor-inductor (LCL) filter circuit coupled to an output of the three-phase switching inverter circuit and the power bus;
- an outer control circuit loop coupled to a capacitor of the LCL filter circuit, wherein the outer control circuit loop includes a proportional-integral oscillator-based repetitive (PIOR) controller, wherein the PIOR controller includes proportional-integral controller elements and oscillator-repetitive controller elements; and
- an inner control circuit loop coupled to an inductor of the LCL filter circuit, wherein the inner control circuit loop includes a proportional (P) controller; and
- wherein the outer control circuit loop and the inner control circuit loop control switching of the three-phase switching inverter circuit.

19. The microgrid system of claim 18, wherein the interface circuit and the renewable energy asset are included in a microgrid forming energy asset of the microgrid system.

20. The microgrid system of claim 18, wherein the outer control circuit loop and the inner control circuit loop provide pulse width modulation control signals to the switching three-phase inverter circuit to regulate the output of the switching three-phase inverter circuit.

* * * * *